US009448861B2

United States Patent
Nottingham et al.

(10) Patent No.: US 9,448,861 B2
(45) Date of Patent: Sep. 20, 2016

(54) CONCURRENT PROCESSING OF MULTIPLE RECEIVED MESSAGES WHILE RELEASING SUCH MESSAGES IN AN ORIGINAL MESSAGE ORDER WITH ABORT POLICY ROLL BACK

(75) Inventors: Alasdair Nottingham, Southampton (GB); Matthew Roberts, Southampton (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 2057 days.

(21) Appl. No.: 12/031,806

(22) Filed: Feb. 15, 2008

(65) Prior Publication Data
US 2008/0201712 A1    Aug. 21, 2008

(30) Foreign Application Priority Data
Feb. 20, 2007  (EP) .................................... 07102721

(51) Int. Cl.
*G06F 9/54*    (2006.01)
*G06F 9/46*    (2006.01)

(52) U.S. Cl.
CPC ............... *G06F 9/546* (2013.01); *G06F 9/466* (2013.01)

(58) Field of Classification Search
CPC ................................. G06F 9/466; G06F 9/546
See application file for complete search history.

(56) References Cited

U.S. PATENT DOCUMENTS

| 7,039,914 B2 | 5/2006 | Potter, Jr. | |
| 2003/0110230 A1* | 6/2003 | Holdsworth et al. | 709/207 |
| 2003/0158883 A1* | 8/2003 | Drudis et al. | 709/102 |
| 2003/0208489 A1 | 11/2003 | Todd | |
| 2004/0172626 A1 | 9/2004 | Jalan et al. | |
| 2007/0118601 A1* | 5/2007 | Pacheco | 709/206 |

FOREIGN PATENT DOCUMENTS

EP    1463249 A1    9/2004

OTHER PUBLICATIONS

IBM Corp., "MQSeries—An Introduction to Messaging and Queuing", Jun. 1995, 47 pages.*

* cited by examiner

*Primary Examiner* — David J Huisman
(74) *Attorney, Agent, or Firm* — Yee & Associates, P.C.; Parashos Kalaitzis

(57) ABSTRACT

A method and system are provided for concurrent message processing. The system includes: an input queue capable of receiving multiple messages in a given order; an intermediary for processing the messages; and an output queue for releasing the messages from the intermediary. Means are provided for retrieving a message from an input queue for processing at the intermediary and starting a transaction under which the message is to be processed. The intermediate logic processes the transactions in parallel and a transaction management means ensures that the messages are released to the output queue in the order of the messages in the input queue.

17 Claims, 3 Drawing Sheets

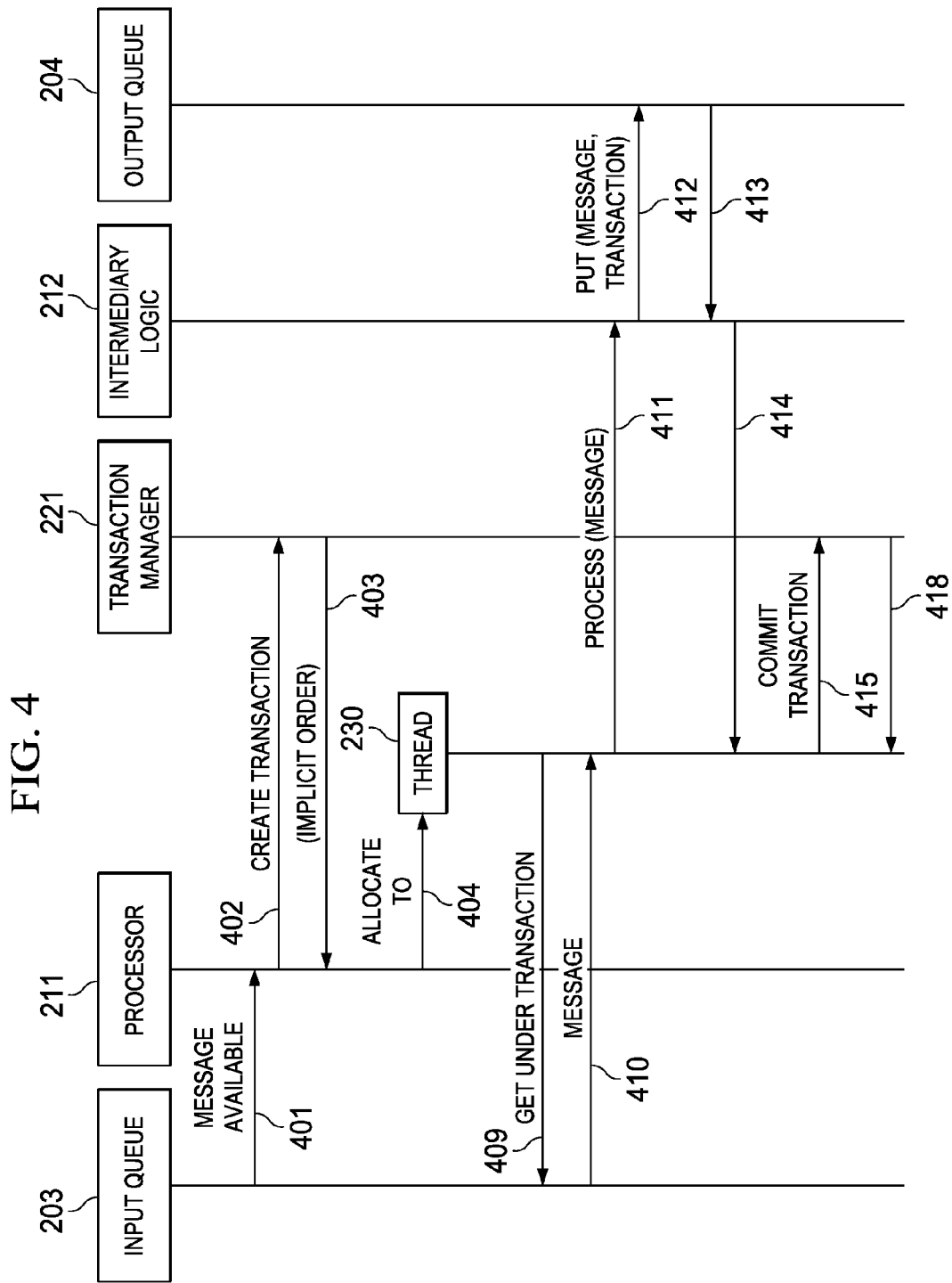

CONCURRENT PROCESSING OF MULTIPLE RECEIVED MESSAGES WHILE RELEASING SUCH MESSAGES IN AN ORIGINAL MESSAGE ORDER WITH ABORT POLICY ROLL BACK

BACKGROUND

1. Field of the Invention

This invention relates to the field of concurrent message processing. In particular, it relates to concurrent message processing of asynchronous messages at an intermediary.

2. Description of the Related Art

A common requirement of asynchronous message queuing systems is for the order of messages sent to any queue to be maintained. This means that a first message sent before a second message must be received by the consumer in that order.

The enforcement of message ordering has many implications for the processing of messages. One of these relates to the processing of messages by an intermediary.

Intermediaries may process messages in various different ways by performing logic between the senders and the receivers of messages. An example intermediary is a message broker that translates a message from the formal messaging protocol of the sender to the formal messaging protocol of the receiver in a telecommunication network where programs communicate by exchanging formally-defined messages.

An example message broker is IBM's WebSphere Message Broker (IBM and WebSphere are trademarks of International Business Machines Corporation) which allows data and information in the form of messages to flow between disparate applications across multiple hardware and software platforms. Rules can be applied to the data flowing through the message broker to route, store, retrieve, and transform the information.

Another example of an intermediary is a mediation framework such as the Service Integration Bus (Sibus) in IBM WebSphere Application Server messaging.

A known solution to the problem of maintaining message order when being processed by an intermediary is to limit what the intermediary is permitted to do. For example, such intermediary limitation may be to remove the intermediary's ability to send additional messages or to delete messages in the flow. In another example, the fields in the message on which the intermediary can perform may be limited. In this case, the simplest solution is to mark the messages with a sequence number and to have the client reorder the messages in the correct sequence on receive. This can be done by the API layer so that it is transparent to the receiving application.

Another solution to the problem is to prevent the intermediary from processing more than a single message at a time. However, this obvious solution results in considerable overheads. If a message ordering requirement does not exist, the intermediary processing entity is allowed to process multiple messages simultaneously, resulting in a much higher throughput of messaging.

US 2003/208489 discloses a system and method of running multiple operations in a resource manager in parallel and sorting out conflicts when they occur. This is done inside a single transaction and ensuring that the parallel operations are executed such that the result is the same as if the operations were serially executed. This involves rerunning operations in the correct order when a conflict occurs.

SUMMARY

An aim of this invention is to provide a mechanism that allows multiple messages to be processed simultaneously at an intermediary, whilst releasing messages in the original message order.

A further aim is to allow logic performed at an intermediary to respect message ordering while running messages concurrently without restricting the functions that can be performed by the intermediary.

According to a first aspect of the present invention there is provided a method for concurrent message processing, comprising: retrieving a first message from an input queue for processing at an intermediary; starting a first transaction under which the first message is to be processed; retrieving a second message from an input queue for processing at an intermediary; starting a second transaction under which the second message is to be processed; processing the first and second transactions at the intermediary in parallel; and operating the transactions to ensure that the messages are released to an output queue from the intermediary in the order of the messages on the input queue.

The method may include retrieving further messages, starting a transaction for each message, and processing the transactions at the intermediary in parallel.

Operating the transactions may include ensuring the commits of the transactions occur in the order of the messages on the input queue. Ensuring the commits of the transactions occur in the order of the messages on the input queue may include ensuring the prepare of the transactions occur in the correct order.

In another embodiment, operating the transactions may include creating the transactions in the order of the messages on the input queue and releasing the message to an output queue in the order in which the transactions were created.

Retrieving a message may include retrieving multiple serially batched messages, and starting a transaction may include starting a transaction in which the serially batched messages are processed.

The transaction for a message may be the transaction required by the intermediary for correct semantic operation.

The transactions may use an abort policy and transactions whose outcome is unknown may be rolled back, and the operation of the transactions may be configured to ensure that the messages are released to the output queue in the order of the messages on the input queue when a roll back occurs.

The transactions may use an abort policy and transactions whose outcome is unknown may be rolled back with an indication being provided of the position in the order of messages of a rolled back message.

The method may include retrieving multiple messages from the input queue simultaneously and starting transactions for each of the messages, or each batch of serially batched messages.

According to a second aspect of the present invention there is provided a system for concurrent message processing, comprising: an input queue capable of receiving multiple messages in a given order; an intermediary for processing the messages; an output queue for releasing the messages from the intermediary; means for retrieving a message from an input queue for processing at the intermediary and starting a transaction under which the message is to be processed; intermediate logic for processing transactions in parallel; and a transaction management means to ensure that the messages are released to the output queue in the order of the messages on the input queue.

According to a third aspect of the present invention there is provided a computer program product stored on a computer readable storage medium, comprising computer readable program code means for performing the steps of: retrieving a first message from an input queue for processing at an intermediary; starting a first transaction under which the first message is to be processed; retrieving a second message from an input queue for processing at an intermediary; starting a second transaction under which the second message is to be processed; processing the first and second transactions at the intermediary in parallel; and operating the transactions to ensure that the messages are released to an output queue from the intermediary in the order of the messages on the input queue.

BRIEF DESCRIPTION OF THE DRAWINGS

Embodiments of the present invention will now be described, by way of examples only, with reference to the accompanying drawings in which:

FIG. 4 is sequence diagram showing flow between components of a second embodiment of a method in accordance with the present invention.

DETAILED DESCRIPTION OF THE PREFERRED EMBODIMENT

Figure 1:
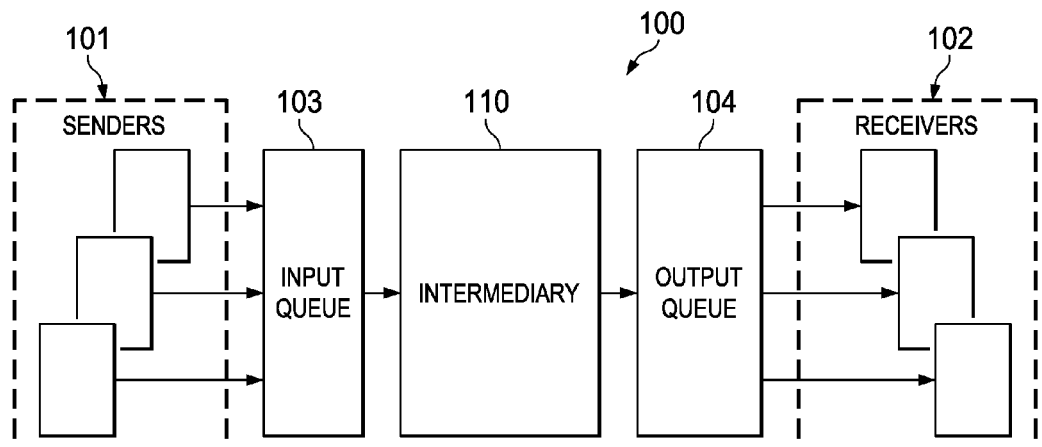
FIG. 1 is a block diagram of a messaging system as known in the prior art.

Referring to FIG. 1, a messaging system 100 includes an intermediary 110 for performing logic between the senders 101 and receivers 102 of messages. For example, an intermediary may be a message broker, a mediation framework, or other form of messaging processing mechanism. Other examples of messaging intermediaries include steps in a workflow and message driven beans.

The intermediary 110 has an input queue 103 to which senders 101 put messages, and an output queue 104 from which receivers 102 get messages. One or more senders 101 may put messages to the input queue 103 and the order that the messages arrive at the input queue 103 must be maintained so that a message receiver or consumer 102 can obtain the messages in the correct order from an output queue 104.

Figure 2:
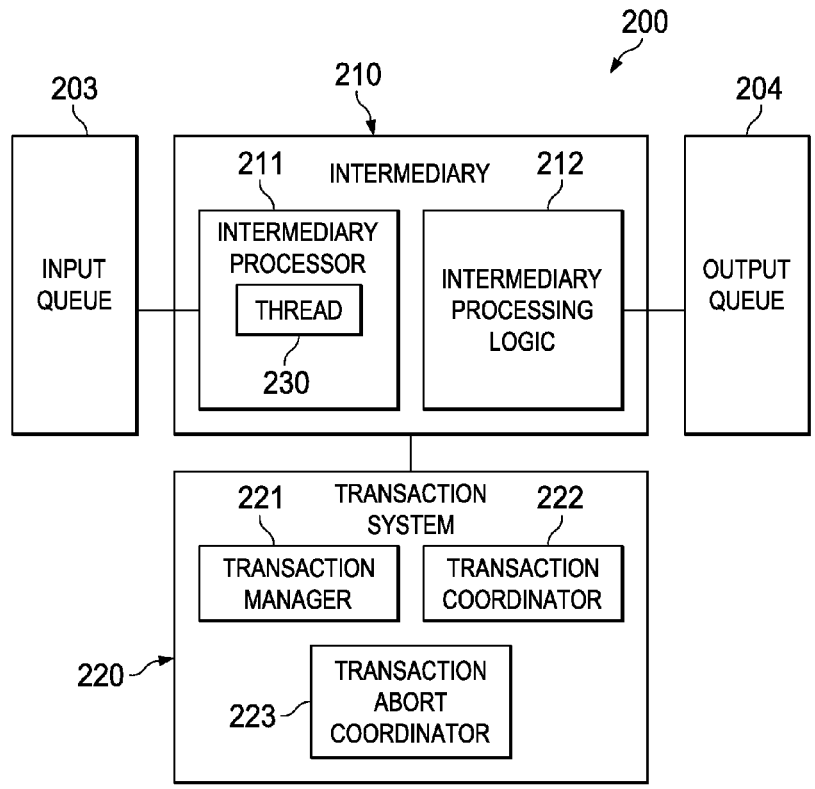
FIG. 2 is a block diagram of a messaging system in accordance with the present invention.

Referring to FIG. 2, a messaging system 200 is shown in which an intermediary 210 retrieves messages from an input queue 203 and delivers them to an output queue 204. The system 200 includes means to ensure that the messages processed by the intermediary 210 are released to the output queue 204 in the same order that the messages were placed on the input queue 203 whilst allowing parallel processing of the messages by the intermediary 210.

The intermediary processor 211 that calls the intermediary logic 212 is modified so that the message processing for a single message is performed in a transaction under a thread 230.

This transaction is the same one, if any, as may be required by the intermediary logic 212 for its correct semantic operation. The intermediary logic 212 may be performing actions that need to be made transactionally (for example, updating a database table) and the contents of the message may need to be contained within a single ACID (Atomicity, Consistency, Isolation, and Durability) transaction in order for the intermediary logic 212 to perform correctly. In order to ensure that the message ordering is performed, the same transaction should be used by the thread 230 and the intermediary logic 212.

The intermediary processor 211 then ensures that the transactions result in output messages in the original order of the input messages. This allows concurrent processing of messages and maintains message ordering, without putting messages at risk of being lost.

A transaction management system 220 includes a transaction manager 221, a transaction abort coordinator 223 to ensure that transactions whose outcome is unknown will be rolled back, and, optionally, a transaction coordinator 222.

The input and output queues 203, 204 are provided by a message queuing system where message ordering has been configured to deliver the messages in the same order if a rollback occurs. Upon rollback of a message, the input queue 203 may ensure that the message is still in the same place in the input order without having the transaction coordinator 222 communicate with it.

As an alternative, an indication may be provided of the position in the sequence of messages of a failed message. The message order must to be available in some form. For example, this may be by only allowing the messages to be accessed in the output queue 204 in the message order, or by providing sequence numbers, or by providing mechanisms to access the next and/or previous messages in the output queue.

The message queuing system knows that it is delivering the message to an intermediary 210 so it will deliver multiple messages at a time.

FIG. 2 is a schematic diagram and the components may be coupled within an integral system or separate entities connected via suitable communications means.

The stage at which the ordering of the messages is set within the intermediary processor 211 of the intermediary 210 may vary depending on the nature of the intermediary 210. In a first described embodiment, the transaction management system 220 is responsible for ensuring the commits occur in the order the messages came into the system. This means that commit time ordering is required, so that the order in which output message is released to the output queue is the same as the order of messages on the input queue. Many intermediaries 210, such as message brokers, make use of commit time ordering.

An alternative embodiment might make use of prepare-time ordering; however existing transaction management systems do not distinguish at an external level between the phases of prepare and commit. An enhanced transaction manager would be able to take advantage of this approach.

In a second described embodiment, a transaction management system 220 provides create-time ordering, in which output messages are released to the output queue in the order in which the transactions were created.

Other patterns of implementation are also possible but require additional steps in order to ensure that they function correctly. For example, it would be possible to implement the transactions in a system that utilizes put-time ordering by providing additional logic to ensure that the puts occurred in the same order as the input messages were read.

In the first embodiment, of commit-time ordering, the system 200 includes a logical transaction management system 220 that includes a transaction coordinator 222 that is able to maintain an order for transactions and ensure that the transactions are committed in a given order. The first embodiment carries out the following method.

1. The intermediary processor 211 discovers that a message is ready for processing.
2. The intermediary processor 211 informs the transaction coordinator 222 of the transaction management system of where the message is in the order.
3. The intermediary processor 211 allocates the processing of the message to a thread 230.
    1. The thread 230 calls the transaction coordinator 222 to start a new transaction.
    2. The thread 230 gets the message from the input queue 203 using the transaction.
    3. The thread 230 calls the intermediary processing logic 212.
    4. The thread 230 calls the transaction coordinator 222 to commit the transaction.
4. Repeat.

The transaction coordinator 222 is responsible for ensuring the commits occur in the order the messages come into the system 200.

The method described above is the optimal path where the commit works successfully, but there are some other paths that need to be considered:

1. There are transactions ready to be committed, but not yet committed and the intermediary processing logic 212 fails.

This is solved by using a presumed transaction abort coordinator 223. When the system is operational again all transactions that were in effect get rolled back prior to new work being performed. This maintains message ordering.

2. A transaction rolls back instead of committing:

This can be solved in one of three ways:
    1. When a transaction is rolled back, all future (and queued) transactions are rolled back until a transaction handling the original message failed message is next to be committed.
    2. When a transaction is rolled back the message queuing system redelivers the message to the intermediary processor 211 which waits until that transaction is ready and automatically puts it to the head of the transaction commit queue.
    3. A combination of 1 and 2, where the intermediary processor 211 waits for a period of time and if the message queuing system has not redelivered the message then all future transactions are rolled back until the right message is available.

Figure 3:
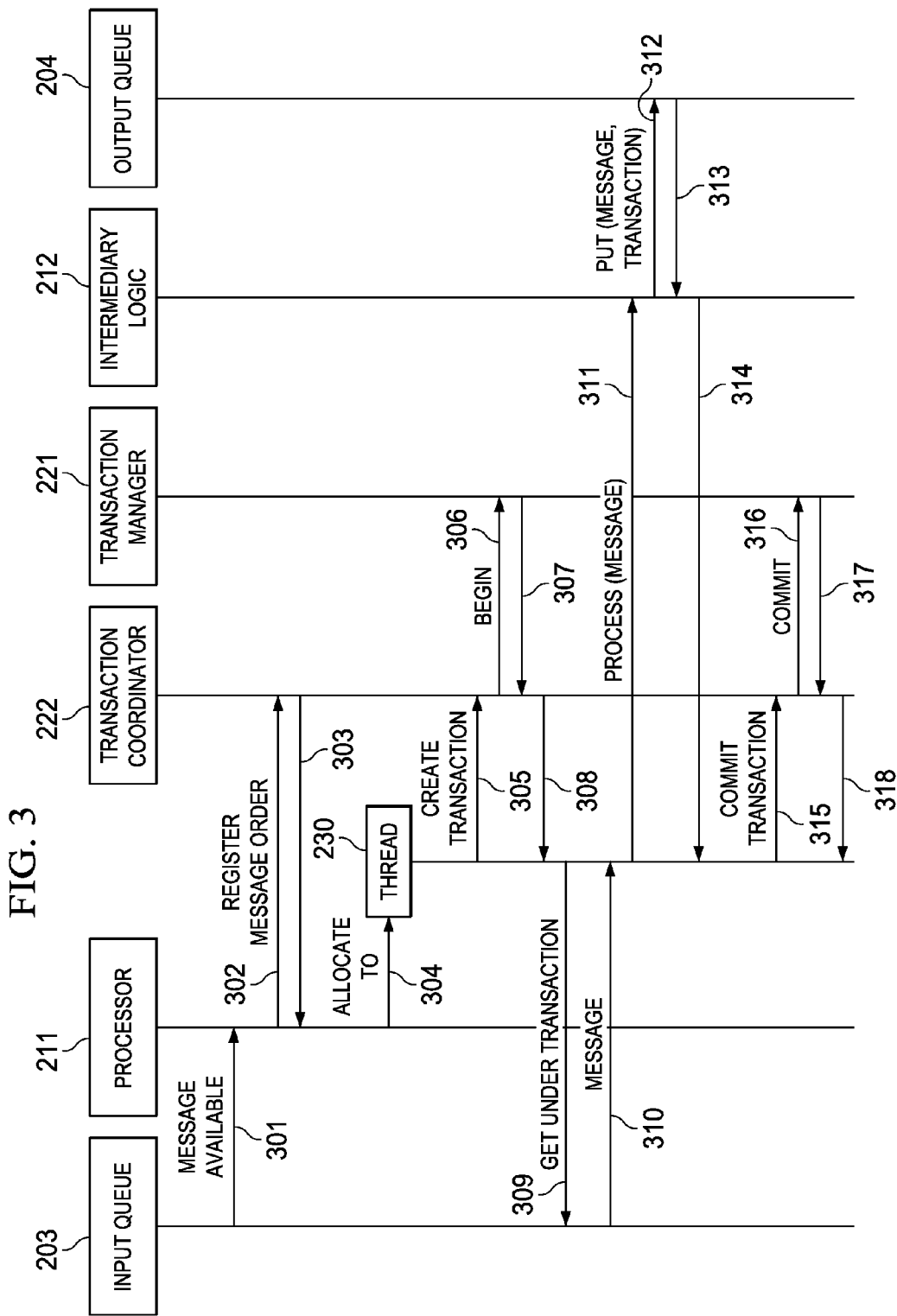
FIG. 3 is a sequence diagram showing flow between components of a first embodiment of a method in accordance with the present invention.

FIG. 3 is a representation of the method steps of the first embodiment between the components of the input queue 203, the intermediary processor 211, the transaction coordinator 222, the transaction manager 221, the intermediary processing logic 212, and the output queue 204.

A message is available 301 to the intermediary processor 211 from the input queue 203. The intermediary processor 211 registers 302, 303 the message order with the transaction coordinator 222. The intermediary processor 211 then allocates 304 the message to a thread 230. The thread 230 creates a transaction 305 at the transaction coordinator 222 and the transaction coordinator 222 begins the transaction 306, 307 at the transaction manager 221 and confirmation is returned 308 to the thread 230.

The thread 230 gets the message 309 under the transaction and the message is sent 310 to the thread 230. The message is then processed 311 by the intermediary processing logic 212 and put 312 under the transaction to the output queue 204. A response 313 from the output queue 204 is returned to the intermediary processing logic 212 and a response 314 is returned to the thread 230.

The thread 230 then commits 315 the transaction at the transaction coordinator 222. The transaction coordinator 222 ensures that the actual commit 316 by the transaction manager 221 occurs in the same order as the original register call, and that only one commit occurs at a time. A response 317 is sent to the transaction coordinator 222 and back 318 to the thread 230.

The transaction manager 221 will have phases such as end, prepare, and commit. These are all performed under this high level commit operation. The transaction coordinator 222 is responsible for ensuring the transaction manager 221 is only asked to perform the high level operation one at a time. With changes to the transaction manager 221 is would be possible to make use of ordering at the lower level prepare or commit operations. This would make the process faster, but would require changes to the transaction manager 221.

In the second embodiment, the transaction management system 220 provides create-time ordering, in which output messages are released to the output queue in the order in which the transactions were created. In this embodiment, there is no transaction coordinator 222.

Under the approach of the second embodiment, the step of the method of the first embodiment of informing the transaction management system of where the message is in the order is replaced by the step of calling the transaction management system to start a new transaction. The message and the new transaction are then both passed to a new thread for parallel processing, and subsequent committing of the transaction.

FIG. 4 is a representation of the method steps of the second embodiment between the components of the input queue 203, the intermediary processor 211, the transaction manager 221, the intermediary processing logic 212, and the output queue 204.

A message is available 401 to the intermediary processor 211 from the input queue 203. The intermediary processor 211 creates a transaction 402 at the transaction manager 221 with implicit order and a response 403 is returned. The intermediary processor 211 then allocates 404 the message and the transaction 402 to a thread 230.

The thread 230 gets the message 409 under the transaction and the message is sent 410 to the thread 230. The message is then processed 411 by the intermediary processing logic 212 and put 412 under the transaction to the output queue 204. A response 413 from the output queue 204 is returned to the intermediary processing logic 212 and a response 414 is returned to the thread 230.

The thread 230 then commits 415 the transaction at the transaction manager 221. A response 418 is sent back 318 to the thread 230. The transaction manager 221 ensures that the actual commit occurs in the same order as the order the transactions were created in. Ordering of commits is not required when using create time ordering. However, if may be used additionally if desired.

The above description provides for allocation of a single message to a given transaction, and aims to ensure that the ordering in which the messages are placed on the output queue is the same as that on the input queue. There is an overhead cost associated with each transaction that is created/committed and so it is sometimes desirable to spread this overhead across a set of messages rather than to incur it for each message. This spreading across a set of messages in a pattern is often described as 'batching'.

As an example, messages 1,2,3 might be allocated to batchOne, which is then assigned to a thread for processing, with all three messages being processed under a single transaction. Once the first batch has been allocated to a thread, messages 4,5,6 are then allocated to batchTwo which is assigned to a second thread, and uses a second transaction to process the messages. As with all aspects of the described method, the key aim is to ensure that the messages appear on the output queue in the same order as they were on the input queue (i.e. 1,2,3,4,5,6).

There are various methods of how messages are allocated to batches; however under the approach described above there is the same problem as when there is one message in each transaction, and thus batching of messages is automatically supported by the described method.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method in an information handling system for concurrent message processing, the method comprising:
  receiving a first message at an input queue coupled to an intermediary, wherein the intermediary executes predetermined logic comprising one of a message broker, a mediation framework, and a message driven bean, between a sender of the first message and a receiver of the first message;
  allocating the first message to a first thread;
  starting a first transaction under which the first message is to be processed;
  the first thread retrieving the first message from the input queue under the first transaction;
  receiving a second message at the input queue;
  allocating the second message to a second thread, wherein the second thread is different from the first thread;
  starting a second transaction under which the second message is to be processed;
  the second thread retrieving the second message from the input queue under the second transaction;
  processing the first transaction and the second transaction at the intermediary in parallel, wherein a respective transaction of each of the first transaction and the second transaction is used throughout by a same thread and same logic of the intermediary; and
  committing the first transaction and the second transaction for release to an output queue from the intermediary in an order corresponding to an original order of the first and second messages in the input queue, using an abort policy, in which unknown transactions with outcomes that are unknown are rolled back, wherein the abort policy includes a policy comprising:
    (a) in response to the roll back, one of all future and queued transactions are rolled back until a particular transaction handling an original message, which failed, is next to be committed;
    (b) redelivering the original message, using a message queuing system, to the intermediary which waits until the particular transaction is ready and automatically puts the particular transaction to a head of a transaction commit queue; and
    (c) a combination of (a) and (b) in which the intermediary waits for a predetermined period of time and, in response to the message queuing system not redelivering the original message within the predetermined period of time, rolling back all future transactions until a correct message is available.

2. A method as claimed in claim 1, including retrieving further messages, starting a transaction for each of the further messages retrieved to form further transactions, and processing the further transactions at the intermediary in parallel, wherein each message is registered in message order with a transaction coordinator of the intermediary.

3. A method as claimed in claim 1, wherein committing the first transaction and the second transaction for release to an output queue from the intermediary in an order corresponding to an original order of the first and second messages in the input queue, using an abort policy, further comprises committing in a same order as an original registered message order, and wherein only one commit occurs at a time.

4. A method as claimed in claim 1, wherein starting the first transaction under which the first message is to be processed and starting the second transaction under which the second message is to be processed further comprises creating each of the first transaction and the second transaction with an implicit order.

5. A method as claimed in claim 1, wherein committing the first transaction and the second transaction for release to an output queue from the intermediary in an order corresponding to an original order of the first and second messages in the input queue using an abort policy, further comprises releasing the first and second messages to an output queue in an order in which the first transaction and the second transaction were created.

6. A method as claimed in claim 1, wherein retrieving the first message includes retrieving multiple serially batched messages, and starting the first transaction includes starting a given transaction in which all of the serially batched messages are processed by the given transaction.

7. A method as claimed in claim 1, wherein the first transaction is a required transaction required by the intermediary for correct semantic operation.

8. A method as claimed in claim 1, wherein the first transaction and the second transaction use an abort policy and unknown transactions with outcomes that are unknown are rolled back, and an indication is provided of a position in an order of messages of a rolled back message.

9. A method as claimed in claim 1, including concurrently retrieving multiple messages from the input queue and starting transactions for each of said multiple messages, or starting a given transaction for processing each batch of serially batched messages.

10. A system for concurrent message processing, the system comprising:
   a messaging system including:
   an intermediary circuit processing multiple messages in parallel and releasing the multiple messages to an output queue;
   an input queue coupled to the intermediary circuit receiving a first message and a second message to form the multiple messages in a given order; and
   a transaction management system circuit coupled to the intermediary circuit controlling transactions under which the multiple messages are processed to ensure the multiple messages are released to the output queue by the intermediary circuit in an order of the multiple messages in the input queue;
   wherein the intermediary circuit allocates processing of the first message to a first thread, which starts a first transaction under which the first message is to be processed,
   wherein the first thread retrieves the first message from the input queue under the first transaction and wherein the intermediary circuit allocates the second message to a second thread,
   wherein the second thread is different from the first thread, and the second thread starts a second transaction under which the second message is to be processed,
   wherein the second thread retrieves the second message from the input queue under the second transaction;
   wherein the intermediary circuit processes the first transaction and the second transaction at the intermediary circuit in parallel; and
   wherein a respective transaction of each of the first transaction and the second transaction is used throughout by a same thread and same logic of the intermediary circuit, and the intermediary circuit further commits the first transaction and the second transaction for release to an output queue from the intermediary circuit in an order corresponding to an original order of the first and second messages in the input queue, wherein the transaction management system circuit includes a transaction abort coordinator circuit that uses an abort policy in which unknown transactions with outcomes that are unknown are rolled back, wherein the abort policy includes a policy comprising:
   (a) in response to a roll back, one of all future and queued transactions are rolled back until a particular transaction handling an original message, which failed, is next to be committed;
   (b) redelivering the original message to the intermediary circuit, by a message queuing system, which waits until the particular transaction is ready and automatically puts the particular transaction to a head of a transaction commit queue; and
   (c) a combination of (a) and (b) in which the intermediary circuit waits for a predetermined period of time and, in response to the message queuing system not redelivering the original message within the predetermined period of time, rolling back all future transactions until a correct message is available.

11. The system as claimed in claim 10, wherein the transaction management system circuit includes a transaction coordinator circuit to ensure commits of the first transaction and the second transaction occur in the order of the multiple messages in the input queue.

12. The system as claimed in claim 11, wherein the transaction coordinator circuit ensures that the first transaction and the second transaction occur in the order of the multiple messages in the input queue.

13. The system as claimed in claim 10, wherein the transaction management system circuit creates the first transaction and the second transaction in the order of the multiple messages in the input queue by starting the first transaction under which the first message is to be processed and starting the second transaction under which the second message is to be processed with an implicit order, and the intermediary circuit releases the multiple messages to the output queue in an order in which the first transaction and the second transaction were created using the implicit order.

14. The system as claimed in claim 10, wherein the intermediary circuit processes multiple serially batched messages in the input queue, and starts a transaction in which all of the multiple serially batched messages are processed.

15. The system as claimed in claim 10, wherein a given transaction of the first transaction and the second transaction for a given message of the multiple messages is a required transaction required by the intermediary circuit for correct semantic operation.

16. The system as claimed in claim 10, wherein the messaging system concurrently retrieves the multiple messages from the input queue and starts transactions for each of the multiple messages, or starts a given transaction for processing each batch of serially batched messages.

17. A computer program product stored on a non-transitory computer readable storage medium, the computer program product comprising computer readable program code which when executed by an information handling system:
   receives a first message at an input queue coupled to an intermediary, wherein the intermediary executes predetermined logic comprising one of a message broker, a mediation framework, and a message driven bean, between a sender of the first message and a receiver of the first message;
   allocates the first message to a first thread;
   starts a first transaction under which the first message is to be processed;
   retrieves, using the first thread, the first message from the input queue under the first transaction;
   receives a second message at the input queue;
   allocates the second message to a second thread, wherein the second thread is different from the first thread;
   starts a second transaction under which the second message is to be processed;
   retrieves, using the second thread, the second message from the input queue under the second transaction;
   processes the first transaction and the second transaction at the intermediary in parallel, wherein a respective transaction of each of the first transaction and the second transaction is used throughout by a same thread and same logic of the intermediary; and
   commits the first transaction and the second transaction for release to an output queue from the intermediary in an order corresponding to an original order of the first and second messages in the input queue, wherein the first transaction and the second transaction use an abort policy, in which unknown transactions with outcomes that are unknown are rolled back, wherein the abort policy includes a policy comprising:

(a) in response to the roll back, one of all future and queued transactions are rolled back until a particular transaction handling an original message, which failed, is next to be committed;
(b) redelivering the original message, using a message queuing system, to the intermediary which waits until the particular transaction is ready and automatically puts the particular transaction to a head of a transaction commit queue; and
(c) a combination of (a) and (b) in which the intermediary waits for a predetermined period of time and, in response to the message queuing system not redelivering the original message within the predetermined period of time, rolling back all future transactions until a correct message is available.

\* \* \* \* \*